Dec. 8, 1953  E. E. BLAUROCK  2,661,498
APPARATUS FOR MOLDING
Filed June 1, 1950
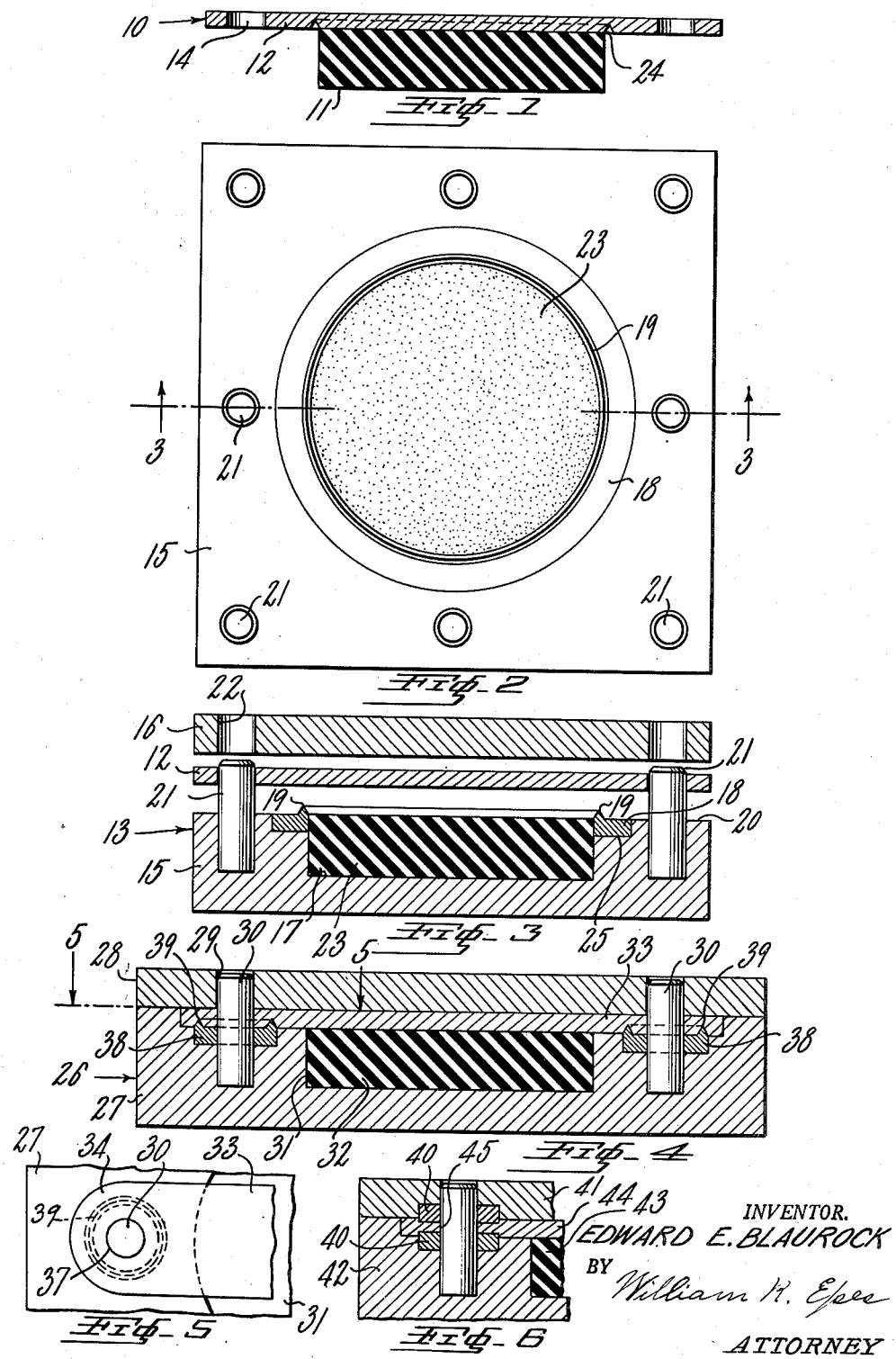
INVENTOR.
EDWARD E. BLAUROCK
BY William K. Epes
ATTORNEY Patented Dec. 8, 1953

2,661,498

UNITED STATES PATENT OFFICE 2,661,498

APPARATUS FOR MOLDING

Edward E. Blaurock, Fort Wayne, Ind., assignor to United States Rubber Company, New York, N. Y., a corporation of New Jersey Application June 1, 1950, Serial No. 165,463

2 Claims. (Cl. 18—36)

This invention relates to the art of making composite articles by molding plastic materials onto preformed inserts or supports having malleable surfaces, and the invention includes an improved apparatus for excluding the plastic from selected portions of the insert or support by forming barriers to the flowable plastic, which are impressed into the malleable surface.

Heretofore, in the manufacture of composite articles containing a plastic, such as rubber, and a malleable metal support therefor, the support was held in place in the mold by clamping between the mold halves the portion of the metal from which the plastic was to be excluded. The plastic was bonded to the portion of the support exposed to the plastic in the mold cavity. Due to the flowable characteristic of the plastic and the pressure applied thereto in the mold, it flowed out between the mold halves and over certain areas of the metal support clamped therebetween, and became bonded to the areas where it was not wanted. After the composite article was removed from the mold it was necessary to remove the unwanted plastic from the surfaces of the metal, which materially increased the cost of the article due to the use of extra equipment and the expenditure of labor and time.

In accordance with the present invention the composite article is made by molding the desired plastic onto the pre-formed insert or support as heretofore, but the flash or overflow from the mold cavity is excluded from the desired areas of the preformed part by clamping the malleable part between the mold parts and impressing hard barriers extending from the mold parts into the malleable surface of the preformed part. Such barriers may either confine the plastic to the mold cavities or shield the desired areas of the preformed part from the flash or overflow from the mold cavity. The barriers may be in the form of a hardened ridge which surrounds the mold cavity so as to prevent the flow of any flash therefrom, or the barriers may be located away from the rim of the mold cavity and surround the area from which the plastic is to be excluded.

This invention will be further described in reference to the accompanying drawings, in which:

Fig. 1 is a cross-sectional view of a composite plastic and metal article, which was made in accordance with the practice of this invention;

Fig. 2 is a top plan view of the improved cavity containing mold part embodying this invention;

Fig. 3 is an exploded cross-sectional view of the mold parts, including the cavity containing part taken on line 3—3 of Fig. 2, in which the cavity is filled with plastic to be molded onto the metal part interposed between the mold cover and the cavity containing part of the mold;

Fig. 4 is a cross-sectional view of a modified form of mold embodying this invention, in which the plastic and metal part which forms the composite article is enclosed between the mold cover and the cavity containing part of the mold;

Fig. 5 is a plan view of a portion of the metal support and the cavity containing part of the mold looking in the direction of the arrows on line 5—5 of Fig. 4; and Fig. 6 is a cross-sectional view of a portion of another form of the mold in its closed position and showing a portion of a composite article similar to the one in Fig. 5 being molded therein.

In the practice of this invention, the composite article 10 containing the plastic 11 and malleable metal support 12, shown in Fig. 1, may be made by the use of the novel mold 13 embodying this invention, as shown in Figs. 2 and 3. As shown in Fig. 1, the plastic of the composite article 10 comprises a vulcanized soft rubber cushion 11 which is bonded to the malleable metal support 12, which is rectangular in form, and may be attached to an object to be supported on the rubber cushion 11 by means of bolts, or screws, or other fastening elements, which are not shown but are adapted to pass through the apertures 14 in the plate 12 and into the object.

The rubber 11 is molded onto the desired portions of the plate 12, and is excluded from the other portions of the plate by the mold 13 shown in Figs. 2 and 3, which comprises a cavity containing part 15 and a top cover 16. The mold cavity part 15 is provided with a cavity 17 having a hardended insert 18 which surrounds the top rim of the mold cavity, and is provided with a V-shaped ridge 19, which projects slightly above the plane of the top face 20 of the cavity containing part 15. Pins 21 are anchored in mold part 15 in position to project into the holes 14 in the metal plate 12, and corresponding holes 22 in the top cover 16, so as to orient such parts in respect to the mold cavity 17. The vulcanizable raw rubber plastic composition 23 is placed in the mold cavity 17. The metal plate 12 and the mold cover 16 are positioned over the pins 21, and the assembled parts are placed in a vulcanizing press (not shown), which exerts pressure on the top of the cover 16 and the bottom of the mold cavity containing part 15 so as to force the parts together. The vulcanizing press supplies sufficient pressure to force the hard ridge 19 into the malleable surface of the metal plate 12 and form a circular groove 24 (Fig. 1) in the plate around the rubber cushion 11, which is molded thereon from the raw rubber composition 23 in the cavity 17. When the hard ridge 19 is impressed into the malleable metal plate 12, the plastic 23 is placed under pressure, and the ridge forms a barrier around the rim of the mold cavity 17 against the flow of plastic therefrom. The ridge 19 thereby excludes any plastic flash from portions of the plate lying outside of the circle of the ridge. The insert ring 18 may be made of hardened steel and pressed into the groove 25 around the rim of the cavity 17.

The metal plate 12 is treated in the well known manner to condition its surface so that the raw vulcanizable rubber plastic 23 will be bonded to the surface during its vulcanization in the vulcanizing press. Upon the removal of the composite article 10 from the mold 13 the surface of the plate 12 will be free from any adhering rubber, other than the cushion 11, which is contained within the groove 24 formed by the barrier ridge 19.

In some cases, it may be impractical to confine the plastic to the mold cavity by means of a surrounding ridge 19 as shown in Fig. 3, because of the great size of the cavity that may be required, or because of the peculiar shape of the preformed insert or support onto which the plastic is to be molded. In such event, the plastic flows between the mold parts, and it may be desirable to exclude the plastic flash or overflow from certain selected portions of the insert or support that may be clamped between the mold parts. An example of the manufacture of such a composite article is illustrated in Figs. 4, 5 and 6. Referring to Figs. 4 and 5, the mold 26 comprises a cavity-containing part 27 and a top mold plate 28, which is provided with apertures 29 adapted to receive the pins 30 in mold cavity part 27 for orienting the top cover 28 with respect to the mold cavity 31, which contains plastic vulcanizable raw rubber 32 being molded onto and bonded to a malleable metal plate support 33 in a vulcanizing press (not shown). The plate 33 is in the form of a strip, as shown in Fig. 5, which extends across the mold cavity 31, and does not cover the entire perimeter thereof.

The plate 33 is provided with ears 34 which are provided with apertures 37 for anchoring the plate in the finished composite article to an object to be cushioned. The apertures 37 are also used to orient the plate 33 in respect to the mold cavity 31 by placing them around the pins 30. It is desirable to prevent the entrance of any flash from the mold cavity 31 into the apertures 37, because it becomes bonded to the edges thereof and must be removed to permit the fastening elements to enter the apertures. For the purpose of excluding the flash, hardened ring inserts 38 are located in recesses around the pins 30 in the cavity containing part 27 of the mold 26. The ring inserts 38 are provided with elevated circumferential ridges 39, which are impressed into the malleable surface of the ears 34 under the pressure of the vulcanizing press, so as to form a barrier around the apertures 37 in the plate 33, so as to exclude the flash from the apertures 37.

In the example as shown in Figs. 4 and 5 the flash from the cavity 31 sometimes flows around the strip plate 33 and flows between the top surface of the ears 34 and the mold cover 28. In the case where the ears 34 are relatively thin, this flow of flash is prevented from entering the upper side of the apertures 37 by virtue of the deflection of the upper surface of the ears 34 against the bottom surface of the mold cover 28 in the areas opposite the barrier ridges 39. In other words, a ring of metal on the top surface of the ears 34 opposite the ridges 39 is tightly pressed against the bottom surface of the mold cover 28 to form a seal around the apertures 37 so as to exclude any flash on the top surface of the ears 34 from entering the apertures 37. After the raw vulcanizable rubber composition 32 has been vulcanized in contact with the plate 33 in the vulcanizing press as previously described in reference to Figs. 1 to 3, the rubber is bonded to the plate 33, and the composite articles may be removed from the mold.

Instead of relying on the deflection of the malleable metal insert or support around the anchoring apertures therein for the prevention of the plastic from entering the apertures in the ears from the top side thereof, as shown in Fig. 6, a raised hardened insert 40 may be placed in the mold cover 41 as well as an insert 40 in the cavity plate 42. The use of the second barrier ring 40 in the mold cover 41 may be necessary in the case where the plastic 43 is molded onto a thick metal plate 44, whose surface on one side will not be deflected by the hardened rim of the barrier insert on the opposite side of the plate. As shown in Fig. 6 the barrier insert rings 40 may be made flat on top instead of being provided with narrow circular ridges, as shown on the insert rings previously described. In the case of flat sided insert rings, slightly more area of the metal plate 44 is displaced around the apertures 45 in the plate 44 than in the case where the narrow ridges are used, but in either case, the flash from the raw vulcanizable rubber composition 43 is prevented from entering the apertures in the plate, and the necessity of removing the rubber flash from the apertures and the area adjacent thereto of the plate after the molding operation is eliminated.

While several forms of this invention have been described herein more or less in detail, it will be understood that changes may be made in the method and apparatus without departing from the spirit of this invention and the scope of the appended claims.

Having thus described my invention, what I claim and desire to protect by Letters Patent is:

1. A metal mold comprising at least two parts having cooperating faces between which a malleable metal part is adapted to be clamped, one of said mold parts having a mold cavity therein for receiving plastic material to be molded into the malleable metal part, locating pins on one mold part adapted to be received by locating recesses in the other mold part and by locating recesses in the malleable metal part when positioned between said mold parts, counter recesses surrounding said pins in said mold part containing said cavity, a ring harder than said mold face located in each of said counter recesses and projecting beyond said face of said mold part, said projecting portion of said ring being adapted to be pressed into the malleable metal part to form a barrier against the flow of plastic from said mold cavity into the locating hole in the malleable metal part.

2. A mold comprising two parts, one of said parts having a mold cavity therein, superimposed recesses in each of said mold parts located adjacent to said mold cavity, locating pins adapted to be received by said recesses and by recesses in a malleable metal part adapted to be clamped between said mold parts, said recesses in both of said mold parts having counter recesses surrounding said first mentioned recesses, a ring harder than the remainder of said mold located in each of said counter recesses and projecting beyond the parting surfaces of said mold parts, and said raised portion of said rings being adapted to be pressed into the malleable metal part to thereby exclude said moldable material from the locating recesses therein.

EDWARD E. BLAUROCK.

References Cited in the file of this patent

UNITED STATES PATENTS

| Number | Name | Date |
| --- | --- | --- |
| 789,695 | Kempshall | May 9, 1905 |
| 2,040,674 | Severance et al. | May 12, 1936 |
| 2,135,570 | Ellis | Nov. 8, 1938 |
| 2,148,079 | Martin, Jr. | Feb. 21, 1939 |
| 2,256,769 | Amrine | Sept. 23, 1941 |
| 2,258,810 | Rabezzana et al. | Oct. 14, 1941 |
| 2,351,329 | Gerstenmaier | June 13, 1944 |
| 2,354,241 | Anderson | July 25, 1944 |
| 2,421,928 | Davis | June 10, 1947 |